United States Patent
Woerner et al.

(10) Patent No.: US 11,757,663 B1
(45) Date of Patent: Sep. 12, 2023

(54) BLOCKCHAIN-BASED MONITORING OF DEVICES

(71) Applicant: emTRUTH, Inc., Glendale, CA (US)

(72) Inventors: Irene Wong Woerner, Glendale, CA (US); Ronald Chi King Kong, Pasadena, CA (US)

(73) Assignee: emTRUTH, Inc., Glendale, CA (US)

( * ) Notice: Subject to any disclaimer, the term of this patent is extended or adjusted under 35 U.S.C. 154(b) by 93 days.

(21) Appl. No.: 16/823,142

(22) Filed: Mar. 18, 2020

Related U.S. Application Data

(60) Provisional application No. 62/822,643, filed on Mar. 22, 2019.

(51) Int. Cl.
| | |
|---|---|
| *H04L 9/00* | (2022.01) |
| *H04L 9/32* | (2006.01) |
| *G06F 8/65* | (2018.01) |
| *G06F 21/44* | (2013.01) |
| *H04L 9/08* | (2006.01) |

(52) U.S. Cl.
CPC .............. *H04L 9/3297* (2013.01); *G06F 8/65* (2013.01); *G06F 21/44* (2013.01); *H04L 9/0866* (2013.01); *H04L 9/3239* (2013.01); *H04L 9/3247* (2013.01); *H04L 9/50* (2022.05)

(58) Field of Classification Search
CPC ... H04L 9/3297; H04L 9/3239; H04L 9/3247; H04L 9/0866; H04L 2209/38; G06F 21/44; G06F 8/65
See application file for complete search history.

(56) References Cited

U.S. PATENT DOCUMENTS

| | | | |
|---|---|---|---|
| 10,181,948 B1* | 1/2019 | Nenov | G06F 9/44505 |
| 2013/0037606 A1* | 2/2013 | Murdoch | G06F 16/13 235/375 |
| 2013/0290729 A1* | 10/2013 | Pettigrew | G06F 21/51 713/187 |
| 2018/0013707 A1* | 1/2018 | Murphy | H04L 51/08 |
| 2018/0114045 A1* | 4/2018 | Ebrahimi | H04L 9/3247 |
| 2019/0065709 A1* | 2/2019 | Salomon | G06F 8/71 |
| 2019/0236598 A1* | 8/2019 | Padmanabhan | G06Q 20/4016 |
| 2019/0281449 A1* | 9/2019 | Luo | H04L 9/30 |
| 2020/0097656 A1* | 3/2020 | Burke | G06F 21/565 |
| 2020/0134656 A1* | 4/2020 | Padmanabhan | H04L 63/123 |
| 2020/0225649 A1* | 7/2020 | Cahill | H04L 9/3239 |
| 2020/0243205 A1* | 7/2020 | Sharma | H04L 63/126 |

* cited by examiner

*Primary Examiner* — Abu S Sholeman
*Assistant Examiner* — Kevin Ayala
(74) *Attorney, Agent, or Firm* — Womble Bond Dickinson (US) LLP

(57) ABSTRACT

A method includes identifying a binary file to be executed on a client device. The method further includes comparing, by a processing device, the binary file to an authenticated version of the binary file stored on a blockchain, in response to identifying the binary file and before executing the binary file. The method further includes, in response to determining that the binary file and the authenticated version of the binary file match, executing the binary file. The method further includes, in response to determining that the binary file and the authenticated version of the binary file do not match, triggering a predefined remedial action.

15 Claims, 6 Drawing Sheets

200

T-Block 1 202

T-Block 2 204

T-Block 3 206

．
．
．

T-Block N 208

Fig. 2

BLOCKCHAIN-BASED MONITORING OF DEVICES

CROSS-REFERENCE TO RELATED APPLICATIONS

This application claims the benefit of U.S. Provisional Patent Application No. 62/822,643, filed on Mar. 22, 2019, the entire contents of which are incorporated by reference herein.

FIELD

The present invention relates to the field of cybersecurity and in particular, relates to blockchain-based monitoring of devices.

BACKGROUND

Modern life and national security is increasingly dependent on a host of connected, heterogeneous devices and networks that provide necessary functions and services. These devices cover a broad range, from internet connected home appliances and autonomous vehicles, to critical network equipment that is part of the fundamental infrastructure running a global network. A class of devices introduced as a broader Internet of Things (IoT) deployment is exponentially creating more connected devices.

Protection of these devices and networks under the umbrella of cybersecurity is an ever evolving and ever-expanding undertaking. Compromise of even low-level IoT devices collecting sensor data could allow access to the broader network. Malicious infiltration of power grids or backbone network infrastructure devices would be catastrophic.

BRIEF DESCRIPTION OF THE DRAWINGS

FIG. 2 is a block diagram illustrating blockchain transaction blocks, in accordance with some embodiments.

DETAILED DESCRIPTION

The value of networked devices is undeniable. From a nation's electrical grids to internet backbones, connectivity is vital to national security and functioning of modern life. However, this same connectivity has made all these networked devices a prime target for cyberattacks and malicious infiltration. The proliferation of Internet of Things (IoT) devices, from drones to home automation, promises to exponentially compound the number of targets for attack and nefarious exploitation.

Advantageously, blockchain-based monitoring of client devices is a solution rooted in technology that brings the immutability of blockchain to monitoring of networked devices. As described herein, to solve the above problems and others, a certified and validated binary image of firmware or software may be stored in a blockchain by trusted users of authority. Deployed networked devices (e.g., routers, firewalls, edge devices, etc.) are monitored and at set intervals, operational firmware or software is compared on a bit-level against the binary record of truth stored in blockchain. If there are differences in this comparison, cybersecurity teams or stakeholders may be alerted to potential device compromise. In one embodiment, alerts may provide secure access to the full product history stored in blockchain. Authorized upgrades of firmware or software may also be stored as updated revisions in blockchain.

In one embodiment, if a device supports integration of a secure unique device identifier (SUDI), the SUDI may also be reflected in the digital twin stored in blockchain. SUDIs can also be monitored, and duplicates may result in an alert sent to the cybersecurity team to alert to potential unauthorized cloning.

Figure 1:
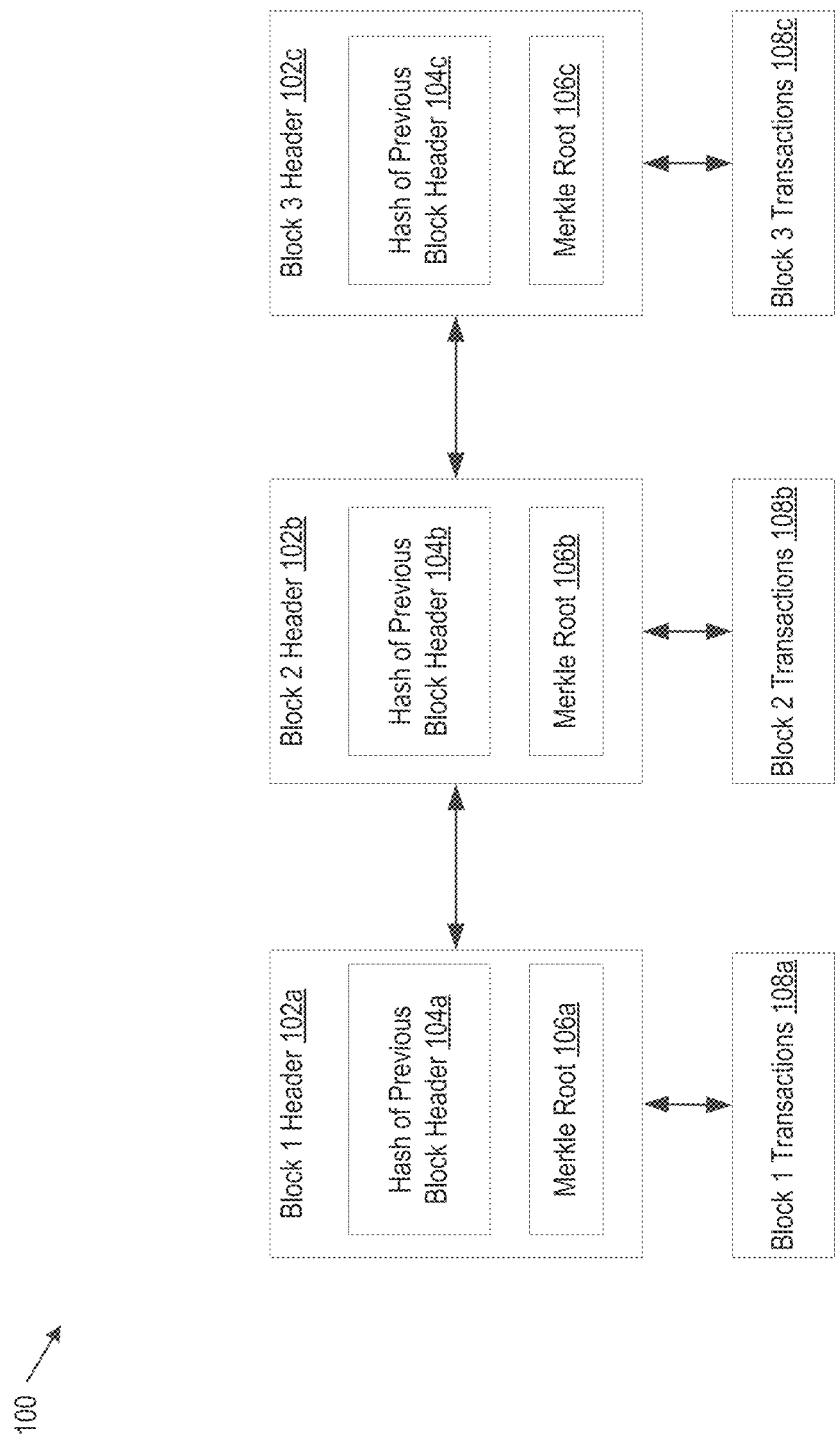
FIG. 1 is a block diagram illustrating a blockchain system, in accordance with some embodiments.

FIG. 1 is a block diagram illustrating a blockchain system 100, in accordance with some embodiments. Although specific components are disclosed in blockchain system 100, it should be appreciated that such components are examples. That is, embodiments of the present invention are well suited to having various other components or variations of the components recited in blockchain system 100. It is appreciated that the components in blockchain system 100 may operate with components other than those presented, and that not all of the components of blockchain system 100 may be required to achieve the goals of blockchain system 100.

Blockchain system 100 may be a peer-to-peer networking system. Operations (e.g., transactions) of blockchain system 100 may be managed collectively by peers in the system. Transactions may occur between peers directly and may be recorded on the blockchain itself.

In FIG. 1, blockchain system 100 is a distributed, peer to peer private or public database that includes a variety of components, including blockchain headers (102a-c) and block transactions (108a-c), and subcomponents, including hashes of previous block headers (104a-c), Merkle Roots (106a-c), and transactions (110a-c). In one embodiment, each block contains a record of recent transactions (e.g., transactions 110a) and a header (e.g., 102a) including a reference to the block that came before it (e.g., 104a) among other data (e.g., a timestamp).

In one embodiment, as described herein, data contained in a block header and/or block transaction data may include data relating to an intrinsic-value of an individual or organization, triggering event that led to a creation of a new block. A distributed ledger provides a universal state layer, a public or private infrastructure in the form of a distributed record of transactions on a peer to peer network with synchronized peer nodes.

FIG. 2 is a block diagram illustrating blockchain 200 transaction blocks 202-208, in accordance with some embodiments. In one embodiment, each of the transaction blocks (e.g., T-blocks) 202-208 may contain transaction data. As illustrated the blockchain 202 is a sequence of T-blocks 202-208. Each T-block (e.g., 202-208) in the blockchain 202, may consist of a list of transactions. Each transaction may then contain a list of data fields that describe that particular transaction. As described herein, transaction data may include copies of authenticated binaries and SUDIs. In one embodiment, transaction data is encrypted. In one embodiment, the current embodiments expand the model of a blockchain to include binary files that are encrypted using the same keys as each associated data block. Advantageously, this allows for bypass of the current size limits on blocks in existing DLT systems, such as Hyperledger and Ethereum. Bitcoin, for example, has a data block of 1 KB. Advantageously, using the embodiments described herein, blockchaining data of any size and format is possible.

Figure 3:
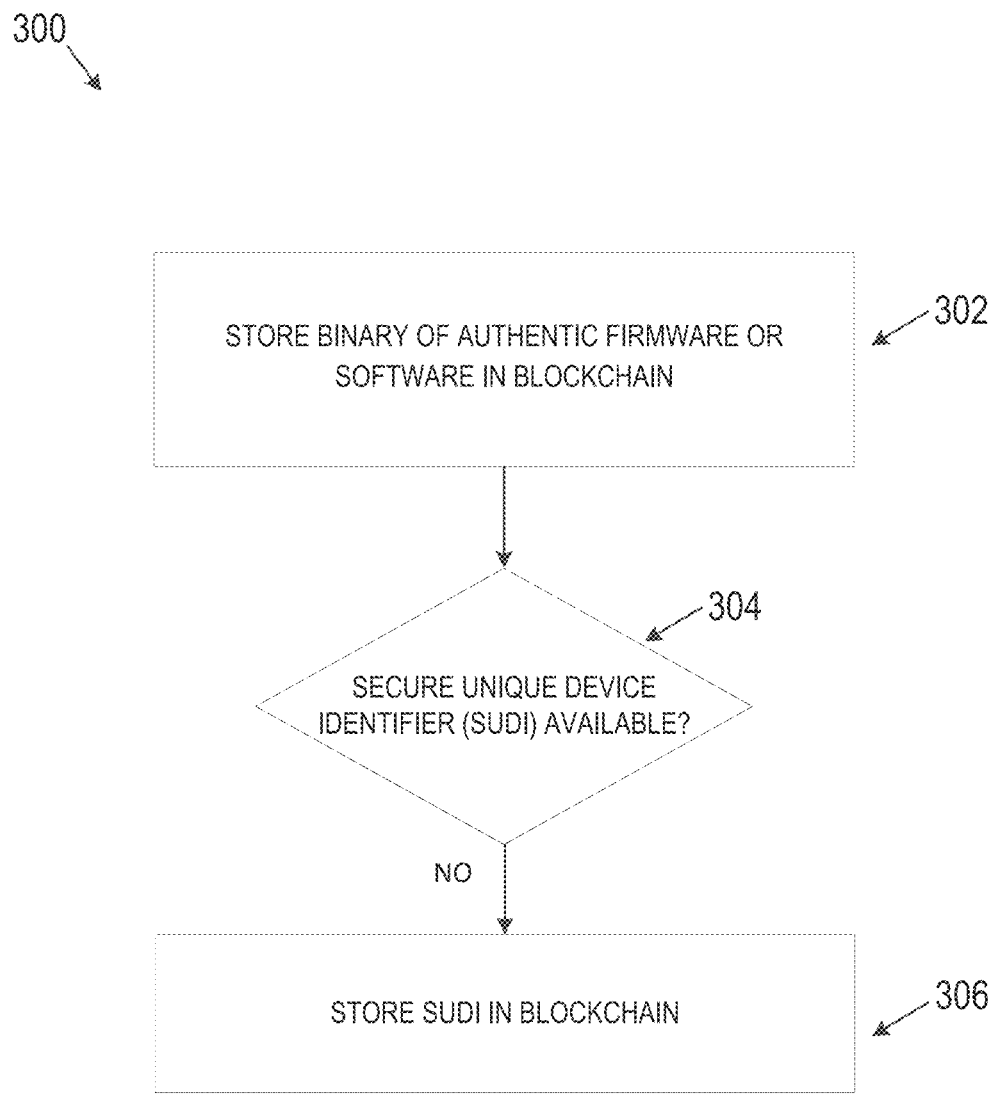
FIG. 3 is a flow diagram illustrating storing of information to a blockchain, according to one embodiment.

With respect to FIGS. 2 and 3, the current invention utilizes the immutability of blockchain to capture a binary version of authenticated firmware or software as the system of record for operational comparison as part of active cybersecurity monitoring of a network client device. Advantageously, an expression of this current invention on a system, such as the one described herein, allows users with authority to upload key metadata elements describing a client device in blockchain and an associated binary file or files representing authenticated firmware or software.

In one embodiment, associated binary files may be stored on a distributed and redundant file system and may be immutably bound to its client device on the blockchain. In one embodiment, this immutable association may be accomplished by hashing the entire binary file with the associated blockchain identifier as part of the encryption. Creating this association is akin to extending the Merkle tree concept beyond a single expression of a blockchain leaf to include hashed files sharing the same child encryption outside of a single block of data.

When a reference binary file (e.g., authenticated version of a binary file) is stored in the blockchain and blockchain-linked files, a daemon may be deployed to extract operational firmware or software from a client device at set frequencies. In one embodiment, if a client device goes offline, the daemon may be configured to reconnect with the disconnected device as soon as the connection has been reestablished to perform a backlog of duties (e.g., maintained by the client device and/or the daemon itself).

In one embodiment, after decryption using the blockchain-linked encryption key, the reference firmware or software (e.g., authenticated version of the binary file) may be compared against the extracted (e.g., identified) operational binary of firmware or software (e.g., the binary to be executed) from a client device. In one embodiment, if the bit-level comparison of reference firmware or software is different from the extracted binary on an operational client device, the system may send alerts or notifications to a pre-determined and authorized set of users, or perform any other remedial action as described herein.

These binary-difference triggered alerts or notifications may indicate that an associated device is potentially compromised. Alert or notifications may include secure access to existing device or product data stored in blockchain or blockchain-linked files.

If a client device has an integrated SUDI, a daemon may be deployed to extract the SUDI associated with the client device at set frequencies. This extracted SUDI may be compared against the reference SUDI stored in blockchain as part of data associated with a client device.

In one embodiment, if the SUDI comparison of reference SUDI in the blockchain is different from the extracted SUDI on the associated client device, the system may send alerts and/or notifications to a pre-determined and authorized set of users (e.g., to the client device having the authenticated SUDI).

These SUDI comparison alerts or notifications may be triggered if more than one client device has the same SUDI and may indicate that a client device is potentially cloned. In one embodiment, alerts and/or notifications may include secure access to existing device or product data stored in blockchain or blockchain-linked files.

As described herein, a blockchain is a hash tree in which every leaf node is labelled with the hash of a data block, and every non-leaf node is labelled with the cryptographic hash of the labels of its child nodes. Meta or description information about a client device is stored in the blockchain. Each blockchain has a unique identifier. For a binary file or files representing a validated and authentic state of a device's firmware or software, each file may be encrypted using the associated blockchain's unique identifier. This association of files to a blockchain becomes a virtual extension of a blockchain expressed as binary files wherein a hashed binary file or files become children on a hash tree as well as a non-identical twin of the child node on the blockchain hash itself. Advantageously, the hashing with a blockchain's unique identifier makes each associated binary file or files or a device immutably tied to a blockchain capturing data descriptive of a client device.

Some client devices may have a secure unique device identifier (SUDI). Securing of a unique identifier can include encryption or digital signing by a trusted authority, like a digital certificate. In cryptography, a public key certificate or a digital certificate is an electronic document used to prove the ownership of a public key. A certificate may include information about the key, information about the identity of its owner, also called a subject, and the digital signature of an entity that has verified the certificate's contents, also called the issuer. If the signature is valid, and the software examining the certificate trusts the issuer, then it can use that key to communicate securely with the certificate's subject.

In some embodiments, a SUDI may be inserted into a device during the manufacturing process. Many device manufacturers may support closed, secured, and audit manufacturing processes to support authenticity of a SUDI. Should a client device have a SUDI, this SUDI may also be stored in the blockchain containing descriptive data of the associated client device.

The embodiments described herein allow for processing logic of a system to, on a set periodic basis, extract firmware or software in binary form from a client device in use. Control of extraction may be performed by, but not limited to, a daemon. A daemon is a computer program that runs as a background process, rather than being under the direct control of an interactive user.

In one embodiment, extraction of firmware or software may be device dependent. Any number of suitable tools that facilitate extraction of firmware or software may be used. Additionally, many electronic chips support protocols like Serial Peripheral Interface (SPI). SPI is a synchronous serial communication interface specification used for short-distance communication. A SPI-enabled device can access firmware, as an example.

In one embodiment, the embodiments described herein allow processing logic to perform a bit-level comparison of an extracted binary from a client device against the system of record binary stored in a blockchain as expressed in a distributed ledger along with its associated file or files as part of this extended blockchain model. Should a binary comparison result in a mismatch, an embodiment of the current invention may send an alert or notification to a pre-defined set of users indicating potential compromise of a device as part of active device monitoring. An alert or notification may include, for example via a link or QR code, that provides secure access to the blockchain containing descriptive information as well as reference binary file or files about a client device.

In one embodiment, on a set periodic basis, processing logic may extract the SUDI from a client device in use.

Control of extraction may be performed by, but not limited to, a daemon. In other embodiments, extraction may be performed by the client device itself. An embodiment of this current invention will compare the extracted SUDI against the reference SUDI stored in blockchain.

Should SUDI comparison result in a mismatch, an embodiment of the current invention may send an alert or notification to a pre-defined set of users indicating potential unauthorized cloning as part of active device monitoring. An alert or notification may include, for example, a link or QR code that provides secure access to the blockchain containing descriptive information as well as reference binary file or files about a client device.

FIG. 3 is a flow diagram illustrating storing of information to a blockchain, according to one embodiment. The method 300 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 3, processing logic at block 302 stores a binary of authentic firmware or software in blockchain. This authenticated copy of a binary file may be stored by the binary's developer, for example. In one embodiment, the authentic firmware or software may be authenticated by the developer themselves, or by a third-party. At block 304, processing logic may determine whether a SUDI is available on a client device requesting execution of the firmware or software. If a SUDI is available, processing logic at block 306 stores the SUDI in a Blockchain containing descriptive data about the associated client device.

Figure 4:
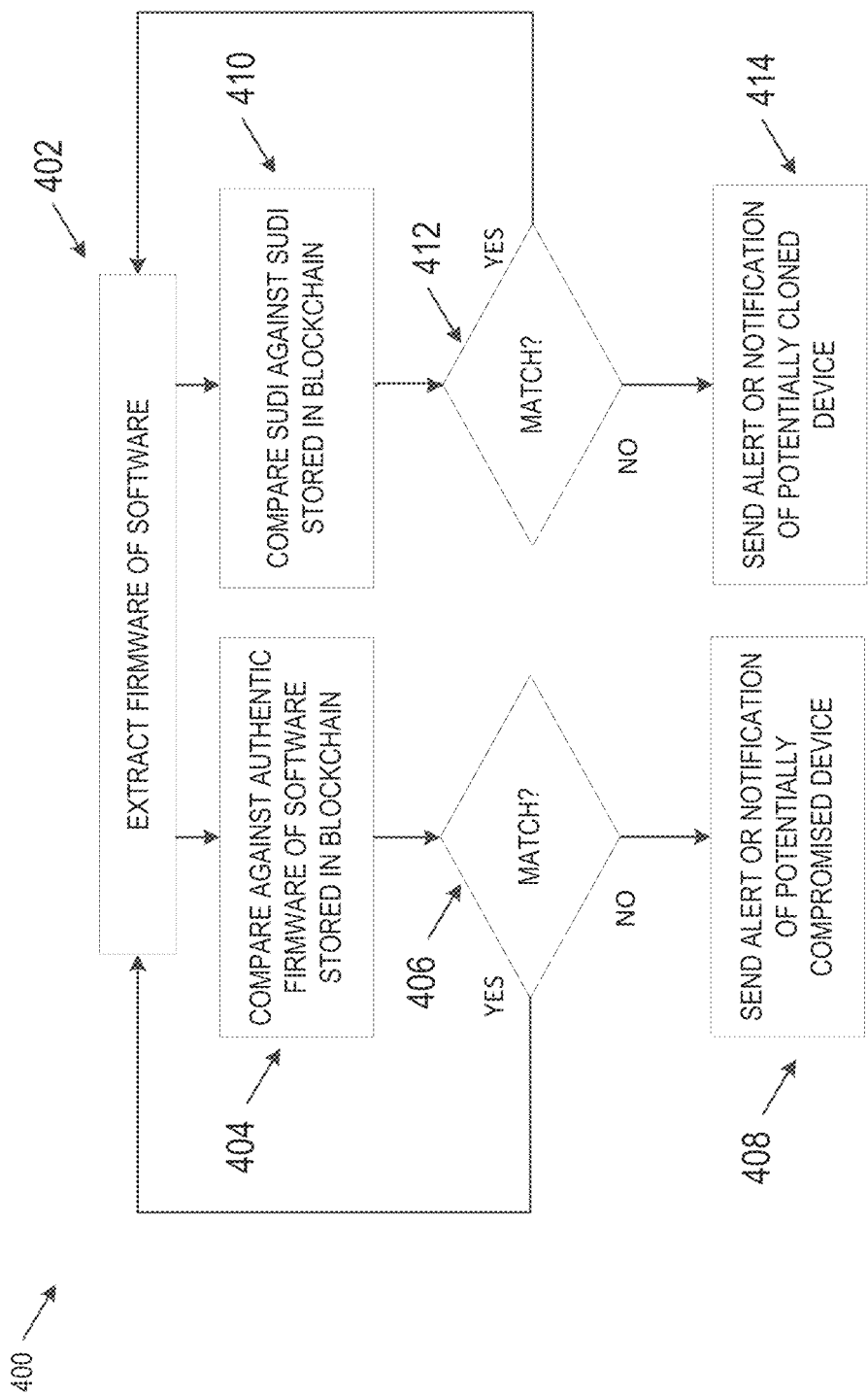
FIG. 4 is a first flow diagram illustrating blockchain-based monitoring of devices, according to one embodiment.

FIG. 4 is a first flow diagram illustrating blockchain-based monitoring of devices, according to one embodiment. The method 400 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 4, processing logic at block 402 extracts, or otherwise identifies, firmware or software to be executed on a client device. At block 404, processing logic compares the extracted or identified firmware or software against an authentic version of the authentic firmware or software in a blockchain.

At block 406, if the two versions do not match (e.g., the firmware or software to be executed is corrupted, infected, or otherwise anomalous) processing logic triggers an alert or notification to be send to one or more client device, servers, pre-defined set of destinations, users, etc. Such an alert or notification may include information indicating that the client device is potentially compromised, along with optional information further describing the compromise. In such a case, processing logic may prevent the software or firmware from being executed on the client device. In another embodiment, processing logic may trigger any other suitable remediation as expressed in pre-authorized executable plans captured in blockchain.

If processing logic determines at block 406 that the two versions match, flow may continue to block 410, wherein processing logic determines if the requesting client device has a SUDI, and if so, such SUDI is compared against an authenticated SUDI stored on the blockchain. Optionally, the flow stemming from block 410 may be performed before the flow associated with block 404.

If, at block 412, processing logic determines that the SUDIs do not match at block 412, processing logic at block 414 may trigger an alert or notification indicating a potential unauthorized cloning of the client device to a pre-defined set of users, devices, etc. In one embodiment, in the event of a mismatch, processing logic may prevent the client device from executing the firmware or software. In another embodiment, processing logic may trigger other remediation as expressed in pre-authorized executable plans captured in blockchain.

In one embodiment, only if both processing logic blocks 406 and 412 (in the case that the client device has a SUDI) result in matches will the software or firmware be installed. In another embodiment, execution may be allowed to proceed as a result of various combination of matches from 406 and 412.

Figure 5:
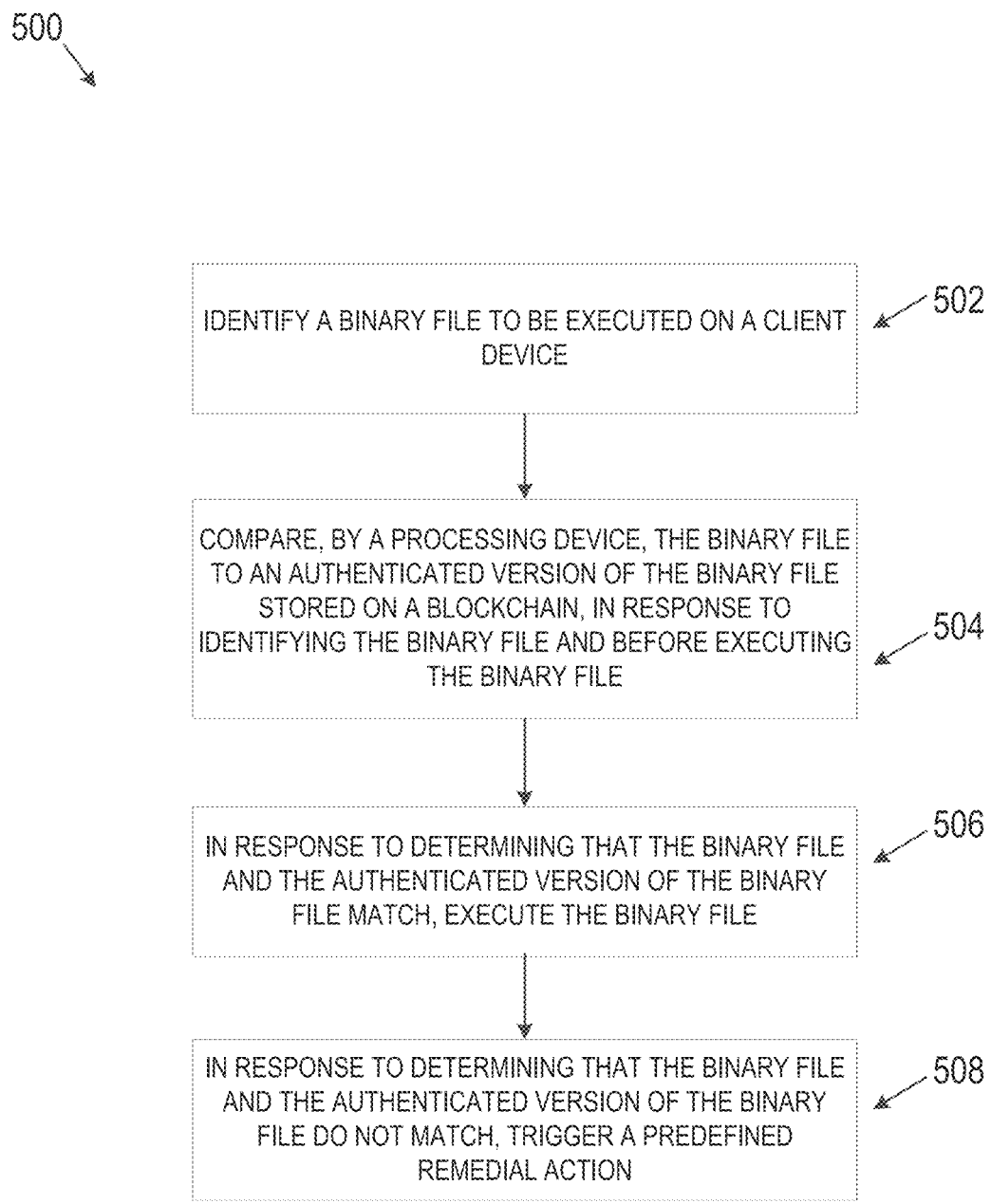
FIG. 5 is a second flow diagram illustrating blockchain-based monitoring of devices, according to one embodiment.

FIG. 5 is a second flow diagram illustrating blockchain-based monitoring of devices, according to one embodiment. The method 500 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 5, processing logic at block 502 identifies (or extracts from a client device) a binary file to be executed on a client device. In one embodiment, the binary file is a software binary file. In another embodiment, the binary file is a firmware binary file. In one embodiment, the client device is an IoT device.

At block 504, processing logic compares, by a processing device, the binary file to an authenticated version of the binary file stored on a blockchain, in response to identifying the binary file and before executing the binary file. In one embodiment, the authenticated version of the binary file is encrypted on the blockchain. In another embodiment, the authenticated version of the binary file is stored with an encryption key derived from the blockchain. In one embodiment, comparing includes a bit-level comparison between the binary file to be executed and the authenticated binary file. In one embodiment, both files may be encrypted to maintain data privacy.

Optionally, processing logic may be responsible for authenticating the authenticated version of the binary file. For example, processing logic may authenticate the authenticated version of the binary file via a developer of the binary file or a third-party authentication method. In response to the authenticating, processing logic may further store the authenticated version of the binary file on the blockchain. In one embodiment, the blockchain is part of a private blockchain network associated with the developer or other authorized, permissioned participants. In another embodiment, the blockchain may be a private blockchain associated with a third party. In yet another embodiment, the blockchain may be a public blockchain.

Returning to block 506, processing logic may, in response to determining that the binary file and the authenticated version of the binary file match, execute the binary file. Alternatively, in response to determining that the binary file and the authenticated version of the binary file do not match, processing logic at block 508 may trigger a predefined remedial action. On one embodiment, a remedial action may include preventing the binary file from executing.

In one embodiment, to trigger remedial actions, processing logic may determine, via an adaptive framework, an appropriate contextual response as expressed in pre-authorized executable plans stored in blockchain. In one embodiment, processing logic may determine the type of threat and take appropriate action based on the determination, according to the pre-authorized executable plans. For example, in the case of a drone being compromised, remedial action may include shutting down the down completely, returning the drone to a known authorized state, instructing the drone to return to some geographical location, trigging a storage protocol to maintain log integrity, etc. In one embodiment, the determined contextual response is defined by the adaptive plan stored in blockchain. In one embodiment, developers and/or other authorized parties may provide the executable plans. In other embodiments, licensees of the binary file (e.g., users of the software or hardware) may provide and/or supplement the executable plans.

In one embodiment, in the event of a mismatch at block 508, processing logic may send an alert to the client device in response to determining that the binary file and the authenticated version of the binary file do not match (e.g., that the device and/or binary file may be compromised). Processing logic may further monitor client devices on a periodic basis via a daemon, for example. For example, in one embodiment, processing logic may periodically compare the binary file, or other binary files, to the authenticated version of the binary file stored on a blockchain.

Optionally, processing logic may validate client devices using an associated SUDI. For example, if a device is determined to have a SUDI, processing logic ma compare the SUDI associated with the client device to an encrypted SUDI, associated with the binary file, stored on the blockchain. Processing logic may further prevent the binary file from executing in response to the SUDI and the encrypted SUDI not matching of perform other suitable remedial action, as described herein. Processing logic may further send an alert to a different client device associated with the encrypted SUDI (e.g., indicating that the different client device may be cloned).

Figure 6:
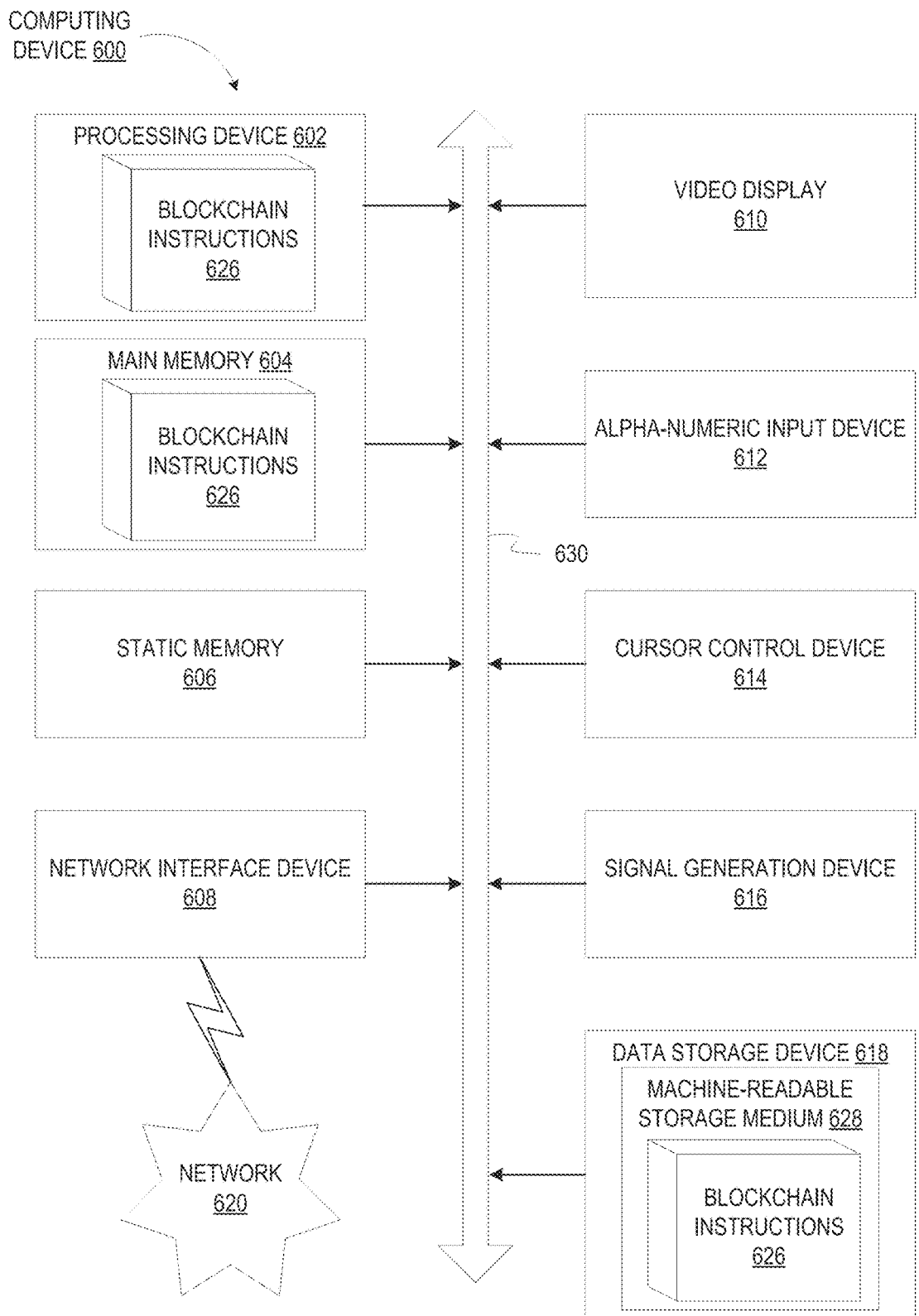
FIG. 6 is a block diagram of an example apparatus that may perform one or more of the operations described herein, in accordance with one embodiment.

FIG. 6 is a block diagram of an example apparatus that may perform one or more of the operations described herein, in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing blockchain logic/instructions 626, for performing the operations and steps discussed herein.

The data storage device 618 may include a non-transitory machine-readable storage medium 628, on which is stored one or more set of blockchain logic/instructions 626 (e.g., software) embodying any one or more of the methodologies of functions described herein, including instructions to cause the processing device 602 to execute operations described herein. The blockchain logic/instructions 626 may also reside, completely or at least partially, within the main memory 604 or within the processing device 602 during execution thereof by the computer system 600; the main memory 604 and the processing device 602 also constituting machine-readable storage media. The blockchain logic/instructions 626 may further be transmitted or received over a network 620 via the network interface device 608.

While the non-transitory machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
    encrypting, using an encryption key derived from a blockchain, an authenticated version of a binary file to generate an encrypted authenticated version of the binary file that is immutably associated with the blockchain, wherein encrypting the authenticated version of the binary file further comprises hashing the authenticated version of the binary file with a unique blockchain identifier of the blockchain;
    storing the encrypted authenticated version of the binary file on the blockchain;
    identifying the binary file to be executed on a client device;
    decrypting, using the unique blockchain identifier of the blockchain, the encrypted authenticated version of the binary file to extract the authenticated version of the binary file;
    comparing, by a processing device, the binary file to the authenticated version of the binary file stored on the blockchain, in response to identifying the binary file and before executing the binary file,
        wherein the blockchain is part of a private blockchain network associated with a developer of the binary file,
    triggering a remedial action in response to determining that the binary file and the authenticated version of the binary file do not match, wherein the remedial action comprises preventing the binary file from being executed, and wherein the remedial action is stored in an adaptive framework in the blockchain;
    comparing a secure unique device identifier (SUDI) that identifies the client device upon which the binary file is to be executed to an encrypted SUDI, associated with the binary file, stored on the blockchain;
    determining a potential unauthorized cloning of the client device in response to the SUDI and the encrypted SUDI not matching;
    preventing the binary file from executing on the client device in response to the SUDI and the encrypted SUDI not matching;
    sending, to a different client device identified by the encrypted SUDI, an alert that indicates the potential unauthorized cloning of the client device and provides access to the authenticated version of the binary file stored on the blockchain, wherein the alert is to be used by the different client device to access the authenticated version of the binary file.

2. The method of claim 1, wherein the binary file is a software binary file or a firmware binary file.

3. The method of claim 1, further comprising periodically comparing the binary file to the authenticated version of the binary file stored on the blockchain.

4. The method of claim 1, wherein the comparing comprises a bit-level comparison.

5. The method of claim 1, further comprising:
    authenticating the authenticated version of the binary file by the developer of the binary file; and
    in response to the authenticating, storing the authenticated version of the binary file on the blockchain.

6. The method of claim 1, further comprising:
    executing the binary file in response to determining that the binary file and the authenticated version of the binary file match.

7. The method of claim 1, further comprising:
    sending an alert to the client device in response to determining that the binary file and the authenticated version of the binary file do not match.

8. A system, comprising:
    a memory to store an authenticated version of a binary file; and
    a processing device operatively coupled to the memory, the processing device to:
        encrypt, using an encryption key derived from a blockchain, the authenticated version of the binary file to generate an encrypted authenticated version of the binary file that is immutably associated with the blockchain, wherein encrypting the authenticated version of the binary file further comprises hashing the authenticated version of the binary file with a unique blockchain identifier of the blockchain;

store the encrypted authenticated version of the binary file on the blockchain identify the binary file to be executed on a client device;

decrypt, using the unique blockchain identifier of the blockchain, the encrypted authenticated version of the binary file to extract the authenticated version of the binary file compare the binary file to the authenticated version of the binary file stored on the blockchain, in response to identifying the binary file and before executing the binary file, wherein the blockchain is part of a private blockchain network associated with a developer of the binary file, trigger a remedial action in response to determining that the binary file and the authenticated version of the binary file do not match, wherein the remedial action comprises preventing the binary file from being executed, and wherein the remedial action is stored in an adaptive framework in the blockchain;

compare a secure unique device identifier (SUDI) that identifies the client device upon which the binary file is to be executed to an encrypted SUDI, associated with the binary file, stored on the blockchain;

determine a potential unauthorized cloning of the client device in response to the SUDI and the encrypted SUDI not matching;

prevent the binary file from executing on the client device in response to the SUDI and the encrypted SUDI not matching;

send, to a different client device identified by the encrypted SUDI, an alert that indicates the potential unauthorized cloning of the client device and provides access to the authenticated version of the binary file stored on the blockchain, wherein the alert is to be used by the different client device to access the authenticated version of the binary file.

9. The system of claim 8, wherein the binary file is a software binary file or a firmware binary file.

10. The system of claim 8, wherein the processing device to:

execute the binary file in response to determining that the binary file and the authenticated version of the binary file match.

11. The system of claim 8, wherein the processing device to:

send an alert to the client device in response to determining that the binary file and the authenticated version of the binary file do not match.

12. A non-transitory computer-readable storage medium comprising instructions, which when executed, cause a processing device to:

encrypt, using an encryption key derived from a blockchain, an authenticated version of a binary file to generate an encrypted authenticated version of the binary file that is immutably associated with the blockchain, wherein encrypting the authenticated version of the binary file further comprises hashing the authenticated version of the binary file with a unique blockchain identifier of the blockchain;

store the encrypted authenticated version of the binary file on the blockchain;

identify the binary file to be executed on a client device;

decrypt, using the unique blockchain identifier of the blockchain, the encrypted authenticated version of the binary file to extract the authenticated version of the binary file;

compare, by the processing device, the binary file to the authenticated version of the binary file stored on the blockchain, in response to identifying the binary file and before executing the binary file, wherein the blockchain is part of a private blockchain network associated with a developer of the binary file, trigger a remedial action in response to determining that the binary file and the authenticated version of the binary file do not match, wherein the remedial action comprises preventing the binary file from being executed, and wherein the remedial action is stored in an adaptive framework in the blockchain;

compare a secure unique device identifier (SUDI) that identifies the client device upon which the binary file is to be executed to an encrypted SUDI, associated with the binary file, stored on the blockchain;

determine a potential unauthorized cloning of the client device in response to the SUDI and the encrypted SUDI not matching;

prevent the binary file from executing on the client device in response to the SUDI and the encrypted SUDI not matching;

send, to a different client device identified by the encrypted SUDI, an alert that indicates the potential unauthorized cloning of the client device and provides access to the authenticated version of the binary file stored on the blockchain, wherein the alert is to be used by the different client device to access the authenticated version of the binary file.

13. The non-transitory computer-readable storage medium of claim 12, wherein the binary file is a software binary file or a firmware binary file.

14. The non-transitory computer-readable storage medium of claim 12, wherein the processing device to:

execute the binary file in response to determining that the binary file and the authenticated version of the binary file match.

15. The non-transitory computer-readable storage medium of claim 12, wherein the processing device to:

send an alert to the client device in response to determining that the binary file and the authenticated version of the binary file do not match.

* * * * *